United States Patent [19]
Kerekes et al.

[11] Patent Number: 5,241,513
[45] Date of Patent: Aug. 31, 1993

[54] CORRELATION SYSTEM FOR NONLINEAR VIBRATORY SIGNALS

[76] Inventors: Albin K. Kerekes, 7019 Judi St., Dallas, Tex. 75252; Robert A. Brook, 3527 Orchard Blossom Dr., Sugarland, Tex. 77479

[21] Appl. No.: 910,473

[22] Filed: Jul. 9, 1992

[51] Int. Cl.⁵ .............................................. G01V 1/36
[52] U.S. Cl. ...................................... 367/39; 367/42
[58] Field of Search ........................... 367/39, 41, 42; 364/728.03, 728.05

[56] References Cited

U.S. PATENT DOCUMENTS

4,346,461  8/1982  Muir ..................................... 367/39
4,715,021  12/1987  Dittert ................................. 367/41

Primary Examiner—Ian J. Lobo
Attorney, Agent, or Firm—Carlton H. Hoel

[57] ABSTRACT

Seismic data is cross correlated with a correlation reference which is an amplitude modified version of a nonlinear sweep. The amplitude modification provides both deboost and tapering.

18 Claims, 10 Drawing Sheets

CORRELATION SYSTEM FOR NONLINEAR VIBRATORY SIGNALS

BACKGROUND AND SUMMARY OF THE INVENTION

This invention relates generally to seismic determination of the depth of subsurface formations in the earth, and more particularly, to a method for seismic wave generation, detection, and interpretation.

Seismic Exploration

Subsurface earth materials and structures determine the elastic response of the earth to surface perturbations. In particular, seismic waves generated on the earth's surface and propagated downward will give rise to reflected waves at the interfaces of layers of differing materials due to the changes of wave velocity and acoustic impedance (which are frequency dependent). These reflected waves may be detected at the surface; and based upon the time interval from source wave generation to reflected wave detection, the depths of reflectors can be calculated. Frequencies in the range of about 5 Hz to 65 Hz provide the best reflection information: lower frequencies have wavelengths too long to resolve layers of thicknesses less than several hundred feet and higher frequencies have attenuation too large to probe to sufficient depths. Both longitudinal waves (pressure waves or P waves) and transverse waves (shear waves or S waves) may be used. P waves typically have roughly double the velocity of S waves, so the use of P waves with double the frequency of S waves achieves roughly equal wavelengths and thus comparable information. Further, digitizing signals by sampling, typically at a rate of 500–1,000 Hz, permits digital signal processing.

Signal Processing

Figure 2:
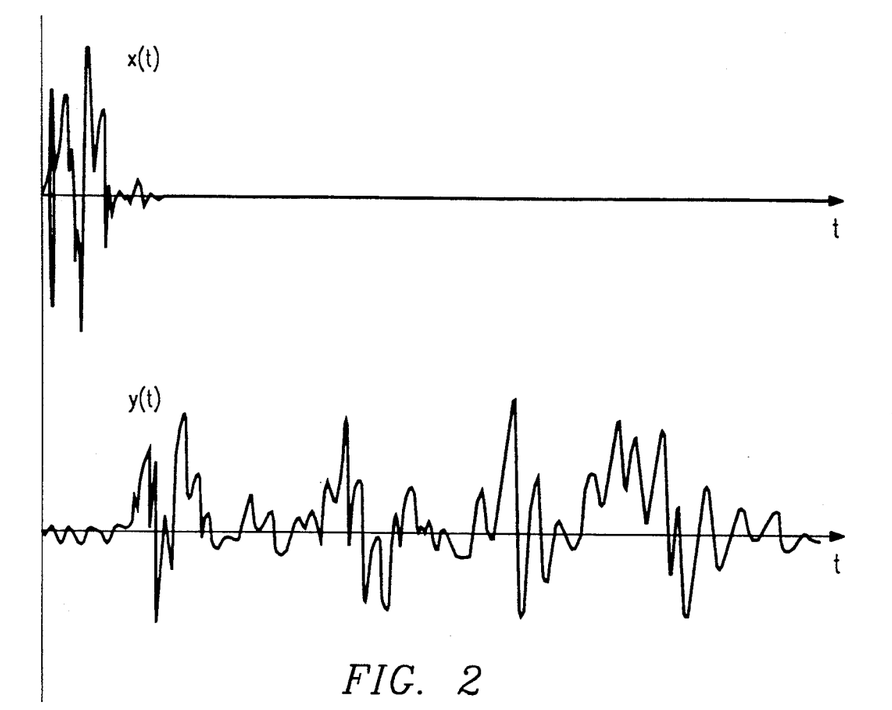
FIGS. 2-3 heuristically illustrate seismic source, received, and processed waveforms.

The earth's subsurface typically includes multiple reflectors at varying depths, and thus upward propagating waves generated from reflections of a single downward propagating wavelet will typically overlap, and subsurface irregularities will lead to noise, so deciphering the received reflected waves becomes a complicated task. FIG. 2 indicates ray tracings for seismic waves generated at seismic wave source 210 and received by geophones 220. Ideally, the wave source 210 generates a wavelet at the surface which propagates down into the earth and has a shape that leads to reflected waves with minimal spread in order that reflectors at differing depths can be resolved. Indeed, if x(t) represents the amplitude of the generated wave (which may be generated by an explosion or ground vibrator and difficult to determine) and if the subsurface structure has an impulse response function of i(t), then with a simple model the received reflected wave is given by the convolution $y(t) = i(t) \otimes x(t)$. Interpretation of y(t) [recovery of i(t)] follows from the steps:

(1) compute the Fourier transform of the received reflected wave, $Y(\omega)$;

(2) add a little noise to the generated wavelet and then compute the Fourier transform, $X(\omega)$; the added noise avoids zeros in $X(\omega)$ so a division by $X(\omega)$ may be performed;

(3) compute $Y(\omega)/X(\omega)$ which essentially equals the Fourier transform of i(t);

(4) edit $Y(\omega)/X(\omega)$ to limit the spectrum to the band of frequencies that exist in the source wavelet x(t), this should be a simple bandpass filtering; and (5) inverse Fourier transform the edited $Y(\omega)/X(\omega)$ to find the deconvolved time domain record which essentially equals the impulse response function, i(t).

Figure 3:
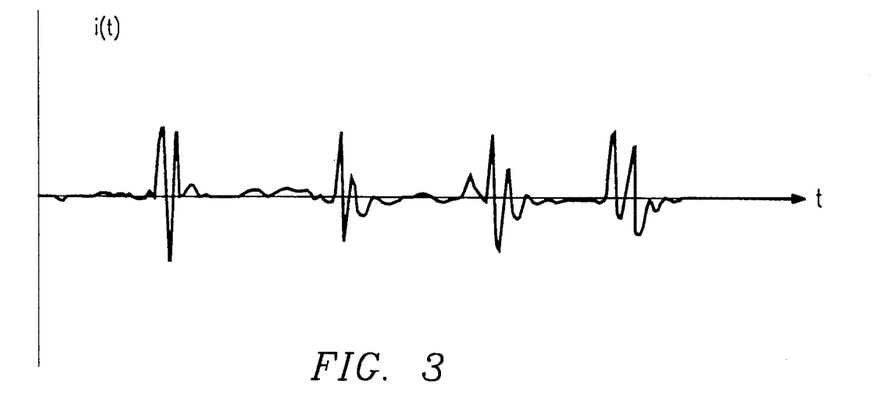

The deconvolved time domain record resolves individual reflectors as illustrated in FIGS. 2–3. FIG. 2 top panel shows a source wavelet x(t) the bottom panel the received reflected wave. FIG. 3 shows the deconvolved record revealing resolution of the reflectors. However, this approach has the problems of inconsistent input signals (especially for those generated by explosion) and a simultaneous input of all frequencies used. This makes the deconvolution difficult.

Frequency Sweep and Autocorrelation

The approach of Doty and Crawford, U.S. Pat. Nos. 2,688,124 and 2,808,577, employs a variable-frequency amplitude-controlled wave generator to generate an elastic wavelet of about 4 seconds duration and with frequency sweeping from 20 Hz to 80 Hz in order to spread the frequencies out in time and also to provide a stable, consistent signal. Such an elastic wavelet also propagates into the earth and reflects from acoustic contrast interfaces that may relate to geology. This time lapsed introduction of the frequencies results in the same time lapsed response for the seismogram that contains the reflected waves. Such a seismogram is an uncorrelated seismic record. To reconstruct the more meaningful form of the instantaneous elastic wavelet, correlate the recorded data with the time lapsed signal of the wave generator to yield the correlated seismic record. Indeed, the sweep creates a non-repetitive "unique" signal which permits cross correlations to resolve the various reflected waves as explained in the following.

Variable-frequency wave generators may use feedback control of their actuators and can be programmed for various frequency and amplitude combinations. One typical application generates a seismic wave x(t) of the form:

$$x(t) = A(t) \sin(kt + bt^2) \text{ for } 0 < t < T$$

with A(t) an amplitude taper. Thus the instantaneous frequency is $k + 2bt$ and increases linearly with time. The received reflected wave record then has the theoretical form:

$$y(t) = \Sigma_{reflectors} C_j a_j x(t - T_j)$$

where $C_j$ is the coefficient of reflection of the jth reflector, $a_j$ is the attenuation of the wave reflecting, and $T_j$ is the wave travel time from the source to the jth reflector and back to the geophone. This may be expressed as $y(t) = i(t) \; x(t)$ by ignoring attenuation. Recovery of i(t) and conversion of the received record y(t) into a record that can be interpreted in terms of geology proceeds by compression of x(t) to roughly simulate an impulse source wavelet. Correlation provides a convenient method of compression. Thus compute the correlated record $c(t) = y(t) \otimes x(-t) = i(t) \otimes x(t) \otimes x(-t) = i(t) \otimes \phi(t)$ where $\phi(t)$ is the autocorrelation of x(t). The Fourier transform of the autocorrelation $\phi(t)$ is the power density spectrum of x(t); that is, Parseval's theorem shows that the integral over frequency of the Fourier transform of the autocorrelation equals the integral over time of $x(t)^2$ and $x(t)^2$ is the energy density. With a compressed $x(t)$ $x(-t)$, $c(t)$ will be analogous to the bottom panel of FIG. 3 and can be interpretable in terms of geology.

Figure 4:
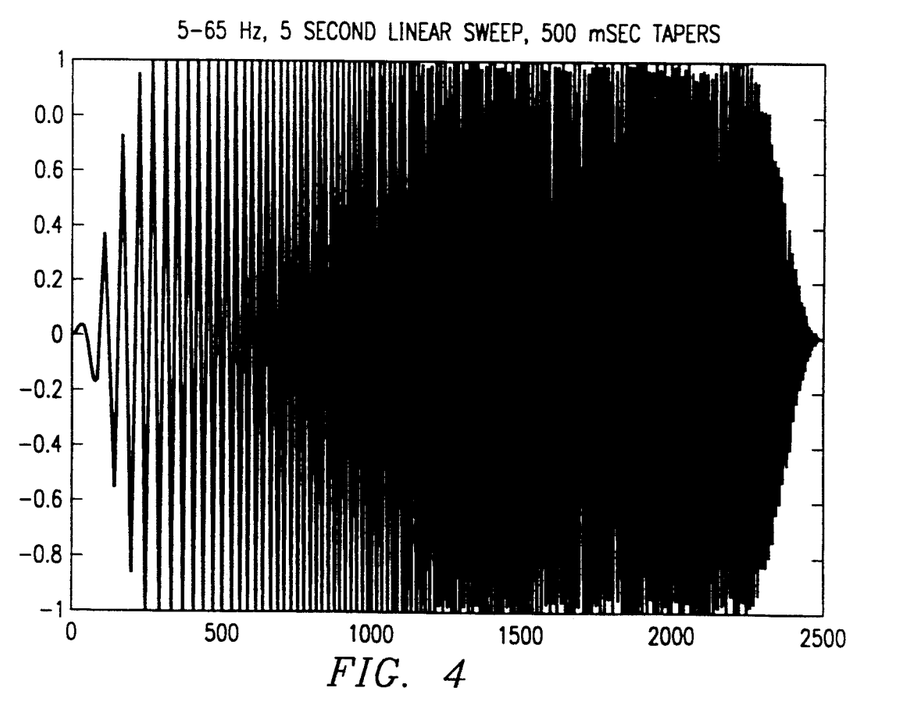
FIGS. 4-6 show a linear sweep frequency source, autocorrelation, and logarithm of the power density spectrum.
Figure 5:
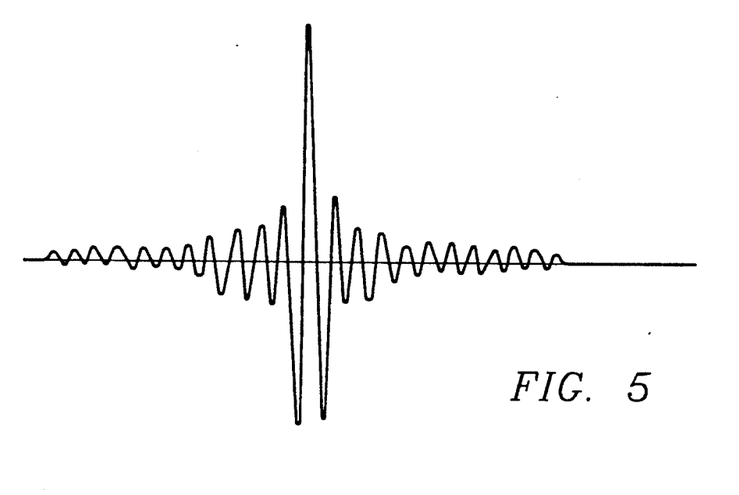
Figure 6:
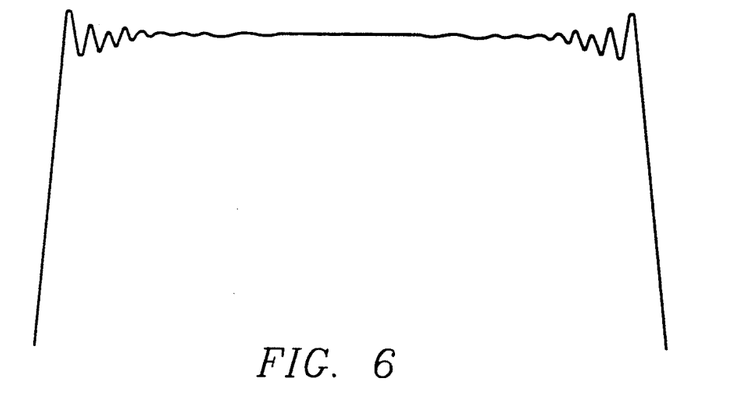

However, the autocorrelation of $x(t)$ may still has an overly large spread in that its sidelobes do not decay rapidly enough for fine reflector resolution, and better compression is needed. Tapering the beginning and ending of $x(t)$ with a cosine curve limits the spread of the autocorrelation. FIG. 4 shows a tapered $x(t)$ with frequency varying from 5 to 65 Hz over a five second interval. The autocorrelation of this $x(t)$ appears in FIG. 5 and the power density spectrum appears in FIG. 6.

Nonlinear Sweeps

Figure 7:
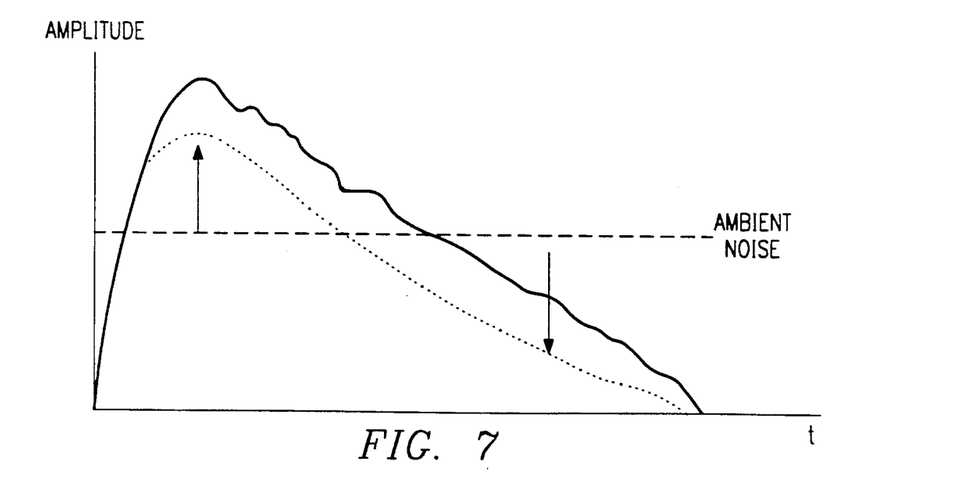
FIGS. 7-8 illustrate nonlinear sweep characteristics.

Doty and Crawford also noted that higher frequency seismic waves have higher attenuation in the earth, due to higher absorption. FIG. 7 illustrates the amplitude of the received reflected wave from a single reflector as a function of frequency for a constant amplitude source wave. Thus if the broken line indicates the amplitude of ambient white noise, then the signal-to-noise ratio drops with frequency and the higher frequencies become unusable. Generally, the signal-to-noise ratio can be increased by (1) reduction of absorption, (2) increase of signal energy (amplitude), and/or (3) decrease of noise. The first alternative cannot be achieved because the absorption is characteristic of the earth; the second alternative may be achieved, but has limits; and the third alternative may be effectively achieved by multiple sweeps with averaging to take advantage of the random nature of the noise.

Figure 8:
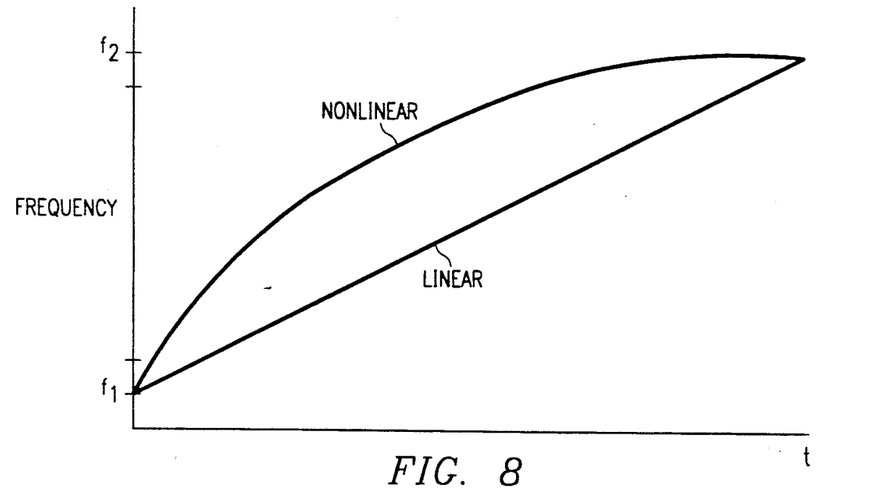

Doty and Crawford proposed that either the amplitude or the duration of the higher frequency portion of the wave source be increased. Of course, longer duration of the higher frequency portion equates to multiple sweeps and averaging of the higher frequency portion. FIG. 8 illustrates the instantaneous frequency for a nonlinear sweep with shorter duration of the lower frequencies but longer duration of the higher frequencies. This nonlinear sweep effectively increases the noise level for the low frequencies because the low frequencies occupy less time than in the linear sweep, but the nonlinear sweep effectively decreases the noise for the high frequencies due to the increases time of the high frequencies which, as noted, amounts to multiple sweeps and averaging. The effective noise level appears as the dotted line in FIG. 7.

Figure 9:
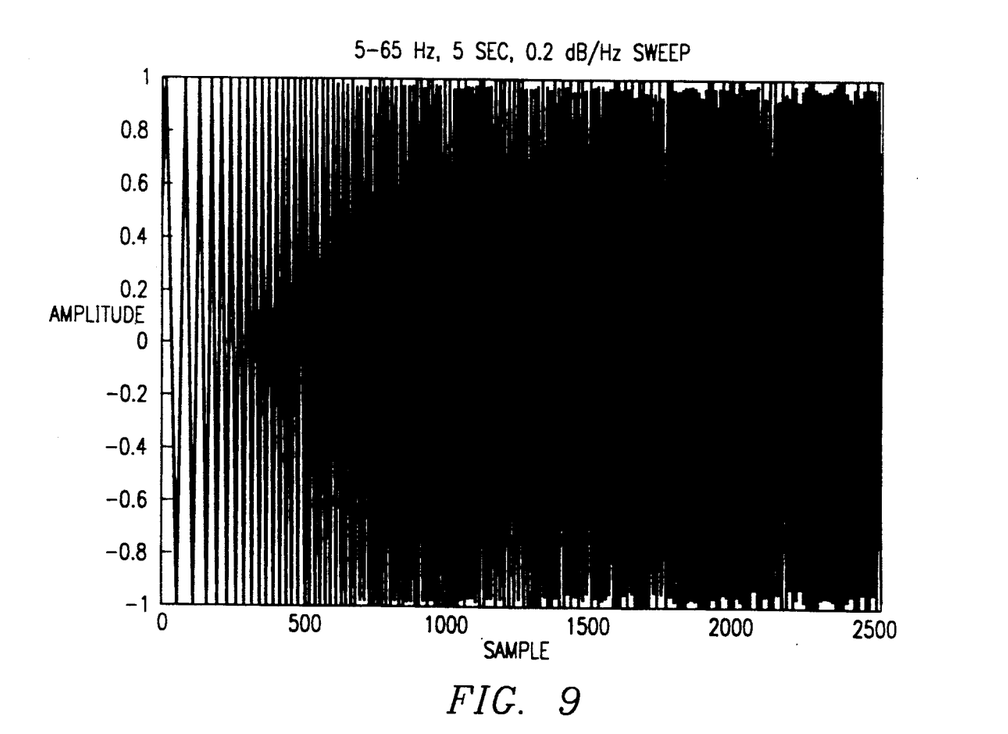
FIGS. 9-11 show a nonlinear sweep frequency source, autocorrelation, and logarithm of the power spectrum.
Figure 10:
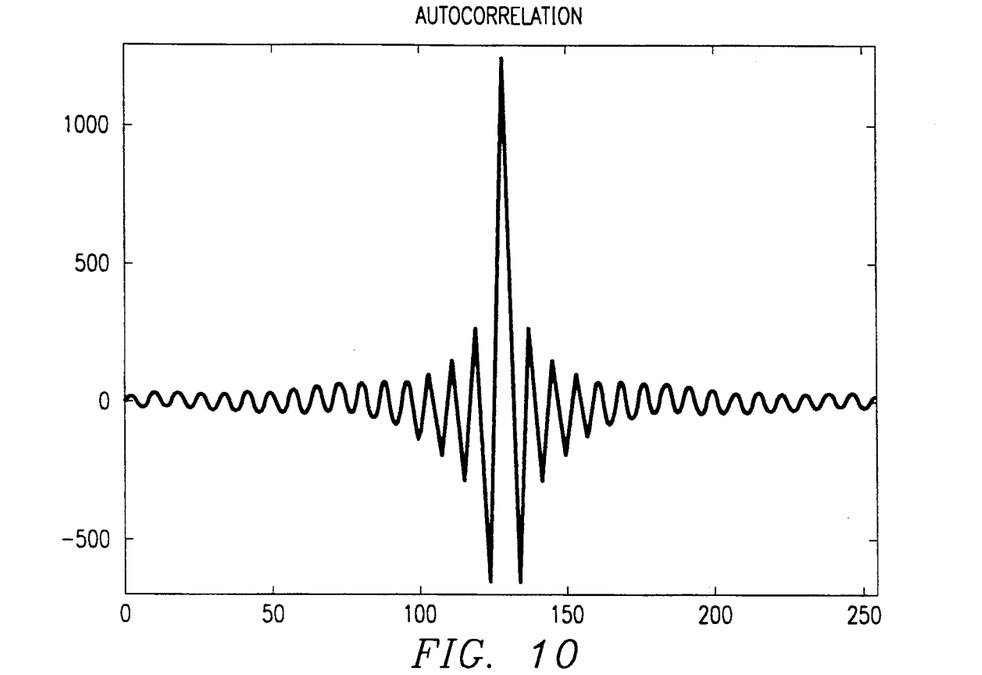
Figure 11:
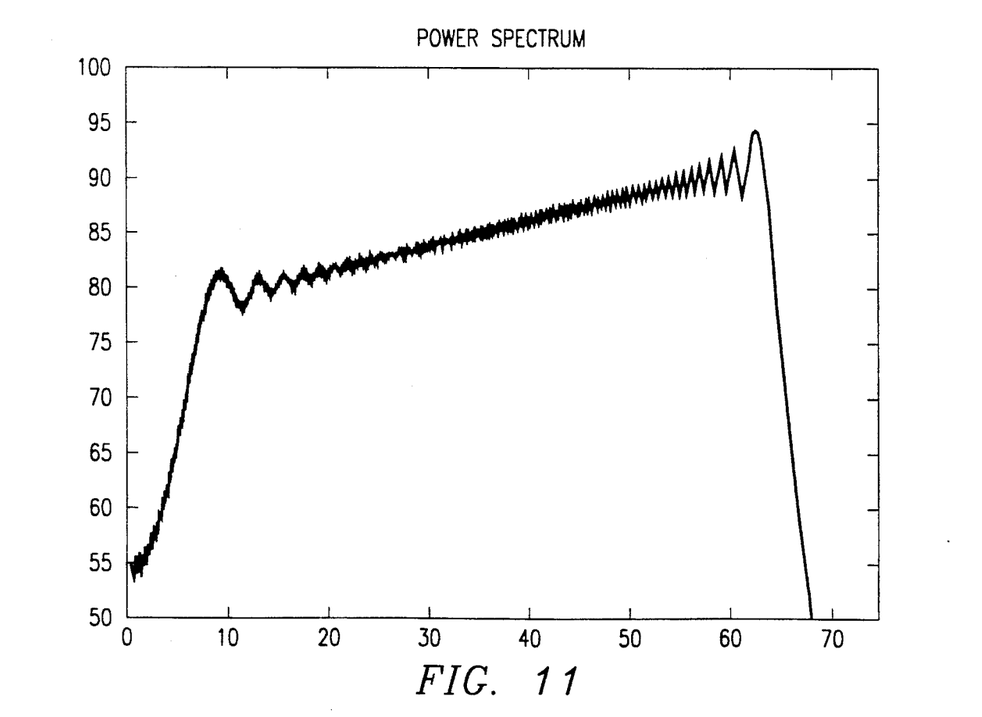

FIG. 9 illustrates a nonlinear sweep with FIG. 10 showin the autocorrelation and FIG. 11 the logarithm of the power density spectrum. This nonlinear sweep has a linear 0.2 dB/Hz power boost with frequency. Such nonlinear sweeps have the noted advantage of an increased signal-to-noise ratio at higher frequencies. However, the correlation process erroneously interprets the increase of time duration of the higher frequencies as an increase of amplitude, resulting in a wavelet that no longer represents its physical equivalent. That is, the wavelet's shape is in error. Consequently, there is a further processing step to compensate for the nonconstant spectral power.

Further, the nonlinear sweeps has the disadvantage of difficult tapering to reduce sidelobes in the autocorrelation. In particular, FIG. 8 shows how tapering would be asymmetrical due to differing rates of change of the instantaneous frequency.

Currently, seismic surveying generates two- and three-dimensional subsurface imaging by use of arrays of geophones on the earth's surface together with digitizers sampling (digitizing) the geophone outputs and sending the digital data to a central correlator. The correlator typically operates in the frequency domain and Fast Fourier transforms the digital geophone data and correlates it with a digitized version of the source sweep. Several thousand geophones may be used, so the correlator typically includes specialized hardware. Thus large amounts of data must be processed and extra processing steps are to be avoided.

Furthermore, the conditions for surveying vary with time and place and may require adjustments in the sweep length, the number of sweeps, and the sweep nonlinearity as the first results of a survey are reviewed in the field. This calls for a flexible system which can quickly change to fit the circumstances and not rely on fixed formats.

Features

The present invention provides an amplitude-modified version of a nonlinear sweep generated source wave for correlation with the received record. The amplitude-modified wave compensates for the nonlinear sweep by selecting the amplitude to yield a minimal sidelobe spread of cross correlation with the source wave and a ripple-free power spectrum. The amplitude-modified version incorporates tapering and thereby permits the use of untapered or minimally-tapered nonlinear sweeps, and modifications to account for local conditions can be made in the amplitude-modified version prior to correlation.

BRIEF DESCRIPTION OF THE DRAWINGS

The present invention will be described with reference to the accompanying drawings which are schematic for clarity.

DESCRIPTION OF THE PREFERRED EMBODIMENTS

Amplitude Modification

Figure 1:
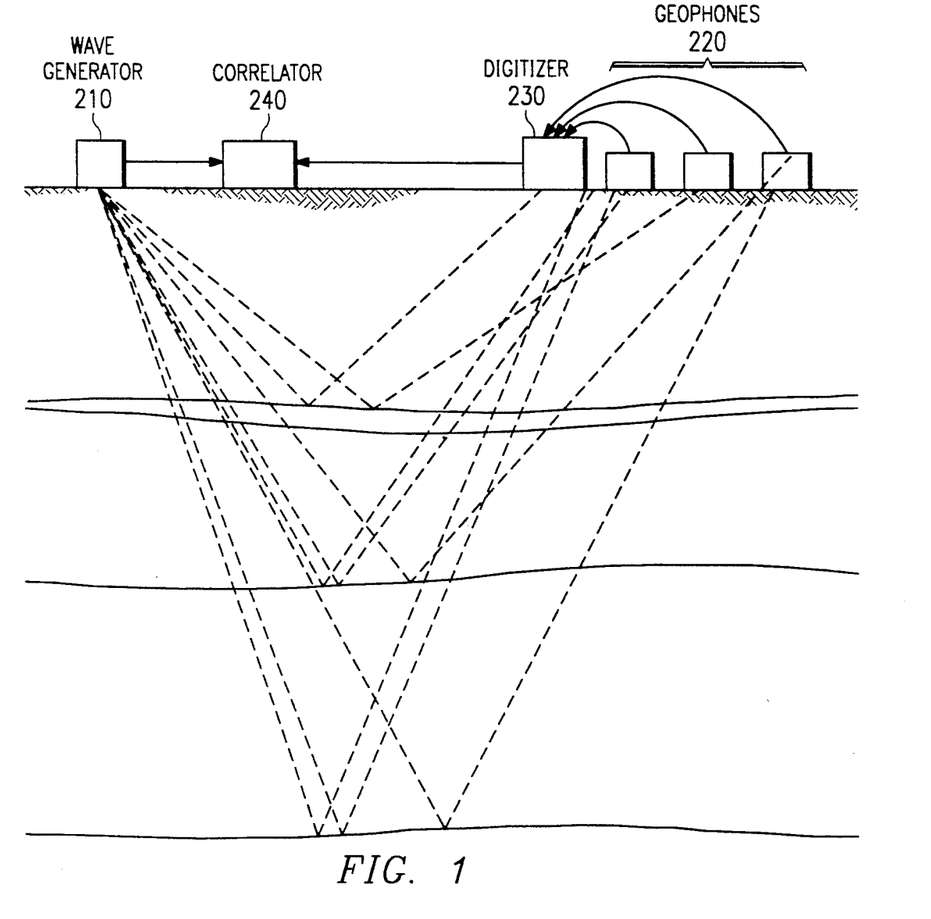
FIG. 1 is a simplified cross sectional elevation view of subsurface formations and seismic wave propagation.

The first preferred embodiment system and method of seismic exploration uses variable frequency seismic wave source 210 to generate seismic waves, geophones 220 to receive and record the reflected waves, digitizers 230 for sampling geophone output, and correlator 240 as illustrated in FIG. 1. However, preferred embodiment correlator 240 includes a source wave modifier in addition to the usual correlator. Correlator 240 correlates the modified source wave with the received record. In particular, if seismic wave source 210 generates a wave x(t) and geophone 220 receives record y(t), then preferred embodiment correlator 240 produces the correlated record $c_m(t) = y(t) \, x_m(-t)$ where $x_m(t)$ is an amplitude-modified version of x(t). Because $y(t) = i(t) \, x(t)$, if $x(t) \, x_m(-t)$ has a ripple-free constant Fourier transform in a frequency band, then i(t) may be easily recovered as $c_m(t)$ in this frequency band.

Figure 12:
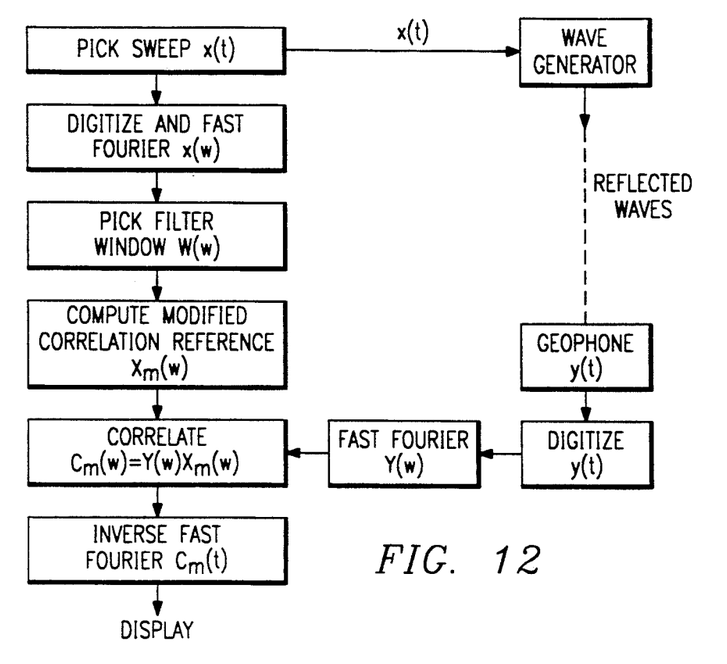
FIG. 12 is a flowchart.

The form of $x_m(t)$ depends upon the characteristics of x(t) and the filter window used to define the frequency band of interest. FIG. 12 is a flowchart of the steps of the first preferred embodiment system which proceeds as follows:

(1) Pick an untapered or minimally-tapered nonlinear sweep, x(t), which will be the source wave. Feed this sweep to seismic wave generator 210 in FIG. 1 to produce waves and which generate the received record y(t) at the geophones 220. Minimal tapering of x(t) may be needed for mechanical reasons due to the inertia of the components of the typical seismic wave generator. Indeed, FIG. 4 shows a taper of 500 milliseconds (msec) at each end of a 5 second sweep; these 500 msec tapers provide the tapering for signal processing demands. In contrast, wave generator 210 may require 10–50 msec tapering in x(t) for mechanical reasons. This 10–50 msec tapering would not be nearly sufficient for the demands of signal processing which may be for an order of magnitude greater tapering. The choice of x(t) depends upon the available wave generator and the estimated characteristics of the earth in the surveyed region; x(t) may have to be changed in the field. Of course, x(t) only appears in sampled (digitized) form in the computations. Let $X(\omega)$ denote the discrete Fourier transform of the sampled x(t). $X(\omega)$ may be computed using a Fast Fourier transform.

(2) Pick a windowed bandpass filter, w(t), to define the frequency band of interest. For example, a standard filter windowing such as the Hamming windowing of an ideal rectangular bandpass could be used; alternatively, a filter could be created by using the autocorrelation of a tapered linear sweep, l(t), which has the same sweep length and same frequency bandwidth as x(t). Let $W(\omega)$ denote the discrete Fourier transform of a sampling of w(t) with the same sampling rate as with x(t). In practice, only the Fourier transform is needed, so w(t) never need be computed, rather just pick the desired $W(\omega)$. $W(\omega)$ typically will be chosen to have a smoothed rectangular appearance as in FIG. 6.

Figure 13:
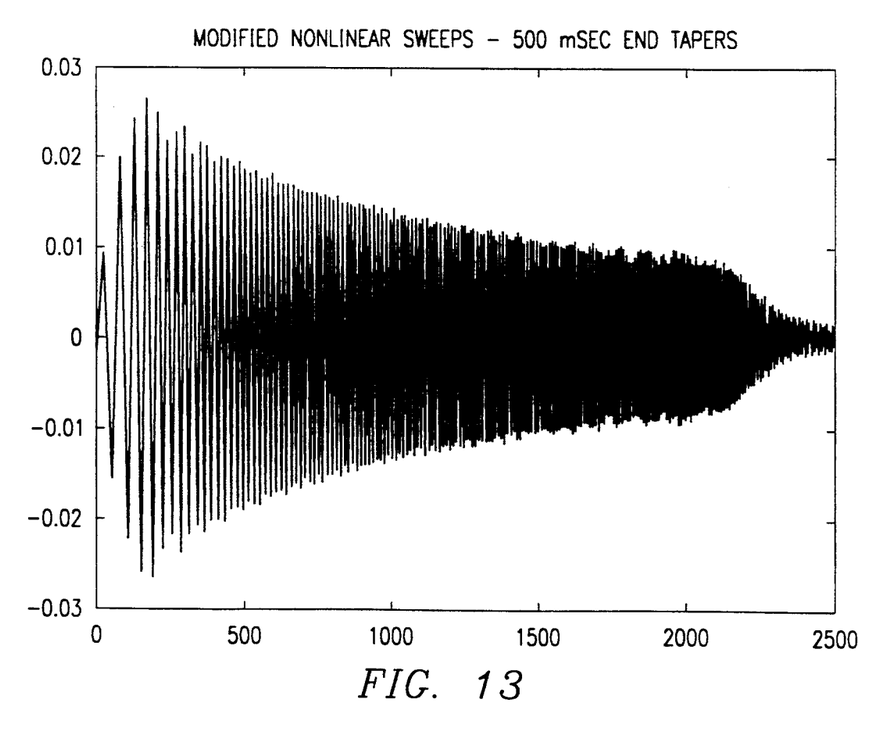
FIG. 13 shows a modified correlation reference.

(3) Define an amplitude function in the frequency domain:

$$Amp(\omega) = |W(\omega)|/(|X(\omega)| + WN)$$

where WN is the Fourier transform of a small added white noise to avoid division by 0; WN is constant and small compared to $|X(\omega)|$ in the frequency interval defined by $W(\omega)$. This amplitude function is combined with the phase of x(t) to produce a modified correlation reference $x_m(t)$ in the frequency domain:

$$X_m(\omega) = Amp(\omega) \cdot e^{j\phi(\omega)}$$

where $\phi(\omega)$ is the phase of $X(\omega)$. FIG. 13 shows $x_m(t)$ if x(t) were as in FIG. 9 and w(t) were derived from the linear boost l(t) of the form of FIG. 4. Again, the computations only use the discrete Fourier of $x_m(t)$, so $X_m(t)$ need not be computed, and $X_m(\omega)$ can be expressed in terms of $X(\omega)$ and $W(\omega)$:

$$X_m(\omega) = X(\omega)|W(\omega)|/|X(\omega)|(|X(\omega)| + WN)$$

(4) Digitize the received records y(t) and then Fast Fourier transform to yield $Y(\omega)$. Multiple geophones implies multiple records $Y(\omega)$.

(5) Cross correlate in the frequency domain: $C_m(\omega) = Y(\omega) X_m^*(\omega)$.

(6) Inverse Fast Fourier transform to recover $c_m(t)$.

(7) Repeat steps (1)–(6) for other locations of the wave generator and geophones to cover the area of interest.

(8) Display the recovered $c_m(t)$'s which can be interpreted in terms of geology.

The first preferred embodiment thus permits use of untapered or minimally-tapered source wave generators and correlations free of additional deboost computations. The use of untapered or minimally-tapered source wave generators effectively adds to the bandwidth because applying the ultimate tapering to the wave generator would especially lessen the amplitude at the higher frequencies and counteract the benefits of the nonlinear sweep.

First Example

Figure 14:
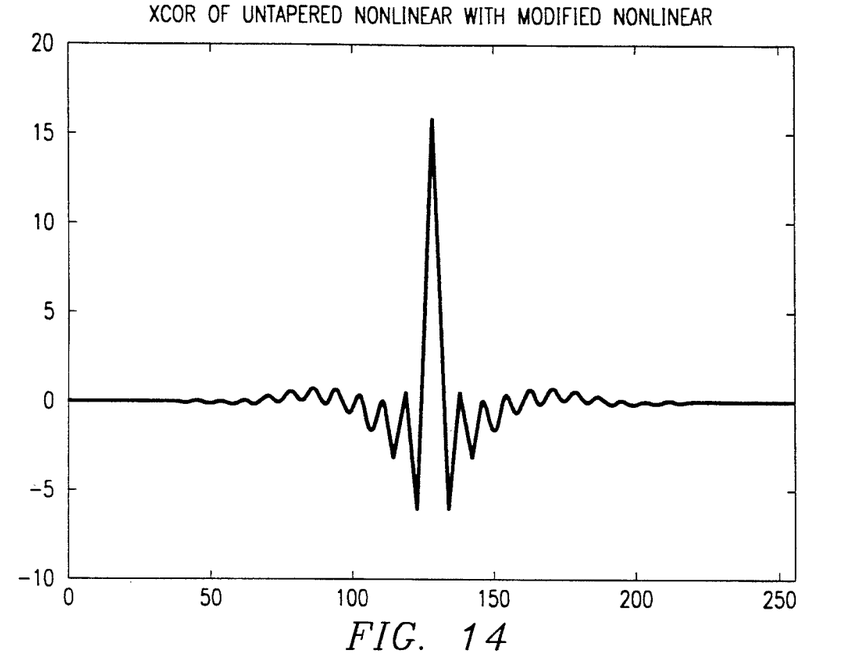
FIGS. 14-15 illustrate the characteristics of the reference of FIG. 13.
Figure 15:
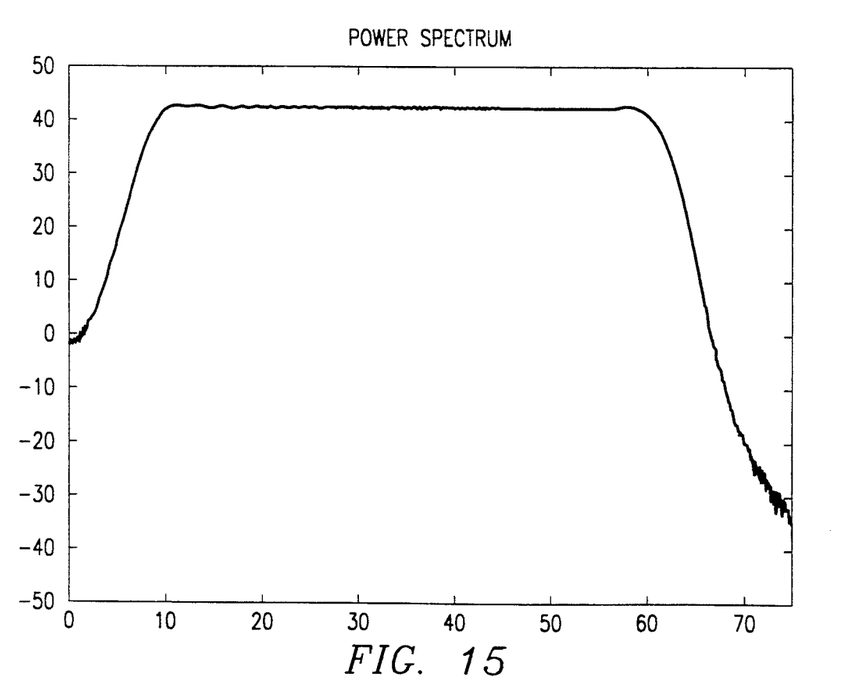

With the untapered nonlinear sweep x(t) of FIG. 9, the foregoing steps yield a modified correlation reference $x_m(t)$ as in FIG. 13. FIG. 14 shows the cross correlation of the x(t) from FIG. 9 with the $x_m(t)$ of FIG. 13 and indicates the resolution available. FIG. 15 shows the associated power spectrum (Fourier transform of FIG. 14) and equals the filter window $W(\omega)$. The smoothed rectangular character is apparent. As previously noted, x(t) typically would need a slight taper for mechanical reasons related to the particular wave generator being used.

Program

The following program listing illustrates the steps with a linear sweep as the source of the filter window. This program generates a dB/Hz sweep in a vector called Sweep and the frequency time curve in a vector called F. A modified sweep ASweep is generated for a de-boost correlation. The technique uses a linear sweep with a Hanning window to design the deboost amplitude.

```
%CLEAR WORKSPACE
clear SL s SF EF D i ASweep Sweep F K M A a Amp FINT
clear k taper j n l N L NN LL peak wn LN ALN aln LS
%USER INPUT
SL = Input ('What is sweep length (msec)?');
s = input ('What is sample interval (msec)?');
SF = input ('What is start frequency?');
EF = input ('What is end frequency?');
D = input ('What is dB/Hz of power spectrum?');
%INITIALIZE VARIALBES
FINT = 0;
I = 0;
AL = SL/1000;
s = 2/1000;
%PELTON VARIABLE CALCULATION
K = 10  (D/20);
M = log(K);
A = exp((M*SF) − log(M));
a = (exp((M*EF) − log(M)) − A)/SL;
%GENERATE SWEEP AND DEBOOST AMPLITUDE
FUNCTION
for t = 0:s:SL
```

```
-continued
i = i + 1;
F(i) = (log(M*((a*t) + A))/M;
FINT = FINT + F(i)*s;
Sweep(i) = sin(2*pi*FINT);
LS(i) = sin (2*pi*(t*(SF + ((EF − SF)*t/(2*SL)))));
end
k = length(Sweep)
tap1 = input ('length of start taper (msec)?:');
tap2 = input ('length of end taper (msec)?:');
tap1 = round (tap1/(1000*s));
tap2 = round (tap2/(1000*s));
han1 = hanning (2*tap1);
han2 = hanning (2*tap2);
taper = ones (1,((SL/s) + 1));
for l = 1:tap1
taper(i) = han1(i);
end
for i = 1:tap2
taper (k−tap2+i) = han2(tap2+i);
end
LS = LS.* taper;
j = 2;
while j<k:
j = j*2;
end
n = zeros (1,j);
l = n;
for i = 1:k
n(i) = Sweep(i);
l(i) = LS(i);
end
N = fft(n);
L = fft(l);
peak = max(abs(N));
wn = 0.001* peak;
LN = abs(L) ./ (abs(N));
ALN = abs(LN) .* exp(sqrt(−1) .* angle (N));
alm = real(ifft(ALN));
ASweep = zeros(1,k);
for i = 1:k
ASweep(i) = aln(i);
end
%CLEAR WORKSPACE
clear SL s SG EF D i F K M a Amp FINT
%PLOT RESULTS
axs
plot (Sweep)
title ('Untapered Sweep')
pause
plot (ASweep)
title ('Modified Sweep')
pause
```

Second Example

Figure 16:
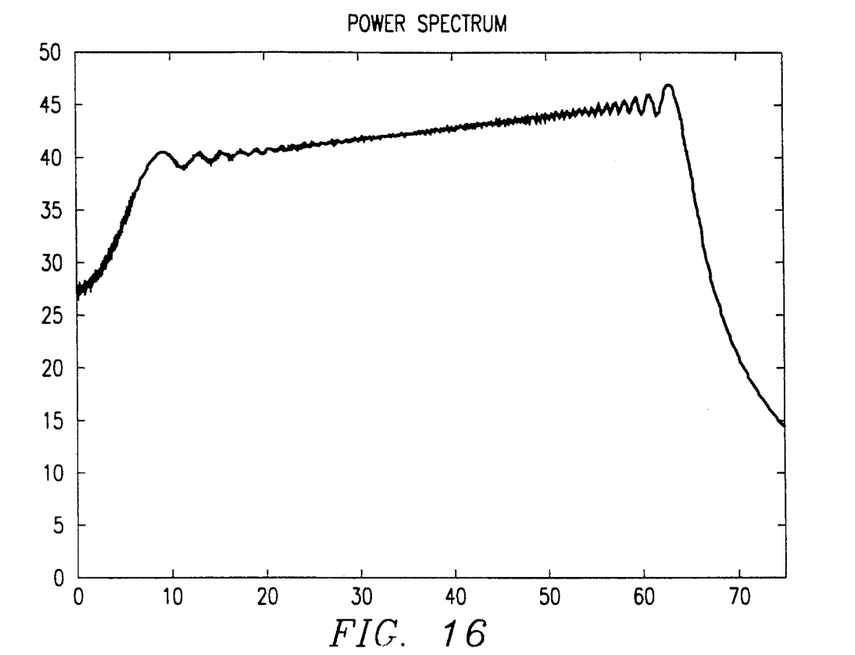
FIGS. 16-20 show characteristics of a second modified reference.

FIGS. 16-20 illustrate another example of the preferred embodiment method of putting deboosting of a nonlinear sweep into the correlation reference. Again, begin with the nonlinear sweep x(t) of FIG. 9 which has a Fourier transform magnitude $|X(\omega)|$ as shown in FIG. 16. That is, take x(t) to have a linear boost of D dB/Hz in the sense that the logarithm of the power density spectrum increases at about D=0.2 dB/Hz between 5 and 65 Hz (straight line fit) from about 78 dB at 5 Hz to 91 dB at 65 Hz. FIG. 10 again shows the autocorrelation, and FIG. 11 the power density spectrum.

Figure 17:
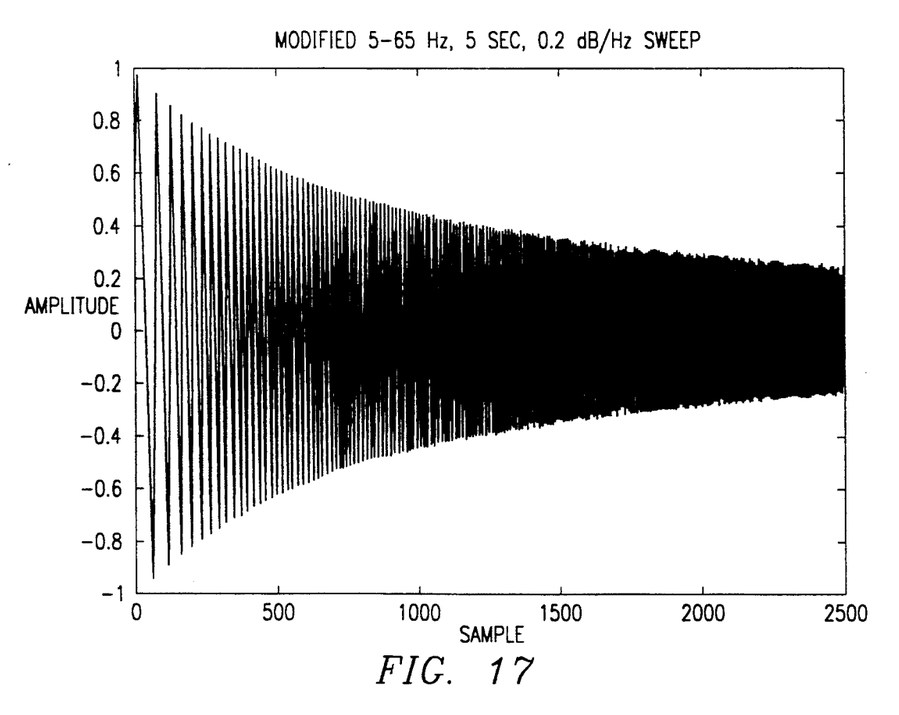
Figure 18:
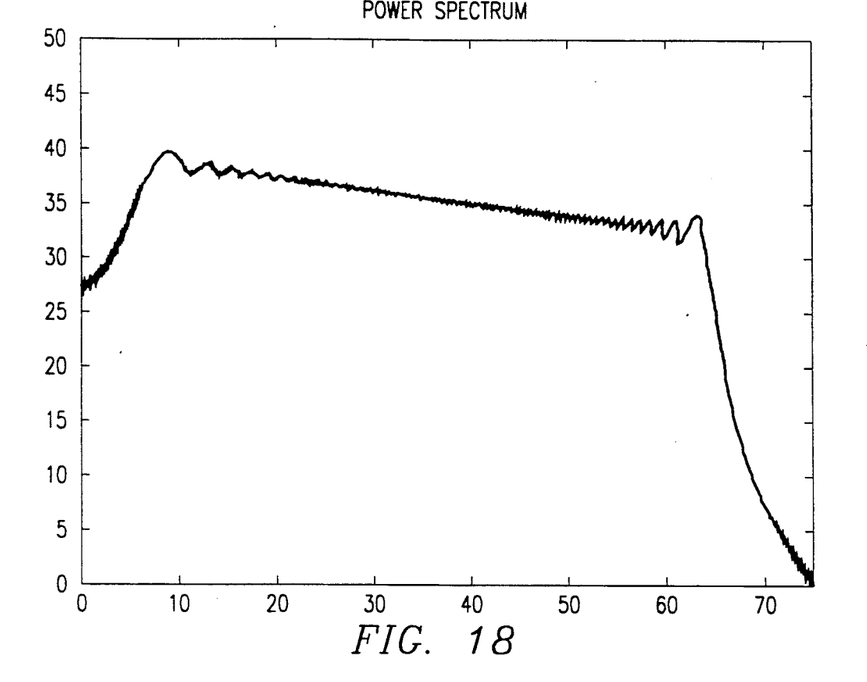

The amplitude modification required to remove the spectral boost in x(t) when correlating is the inverse of the spectral boost; that is $$10^{-[f(t)-f(0)]D/20}$$

in the range of 5 to 65 Hz where f(t) is the instantaneous frequency for x(t) in the time interval 0 to 5 seconds. Thus $x_m(t)$, which is x(t) multiplied by this amplitude modification, would appear as in FIG. 17 with FIG. 18 showing the magnitude of the Fourier transform $|X_m(\omega)|$ indicating the deboost of 6 dB over the 5 to 65 Hz band.

Figure 19:
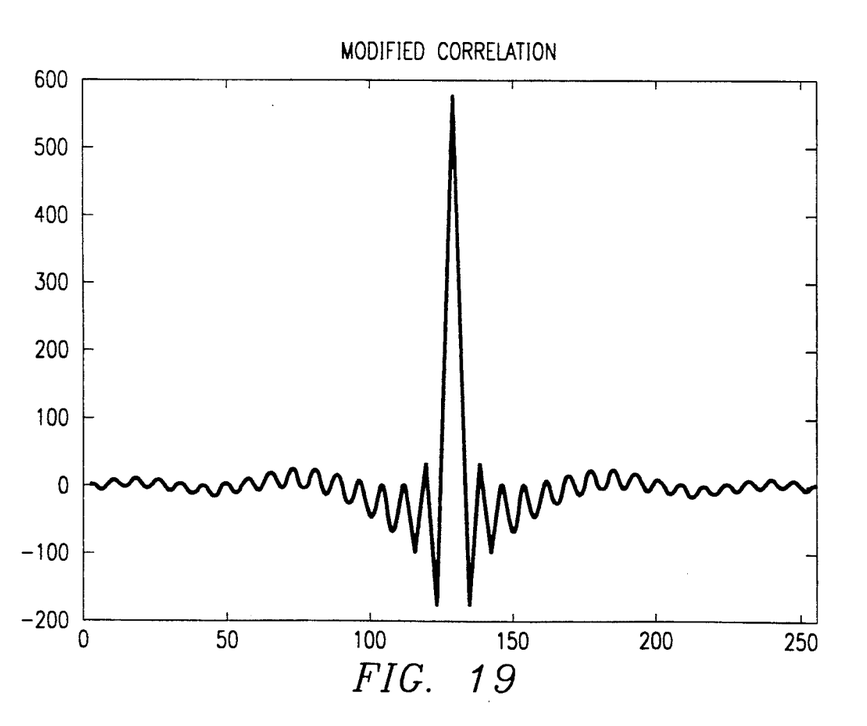
Figure 20:
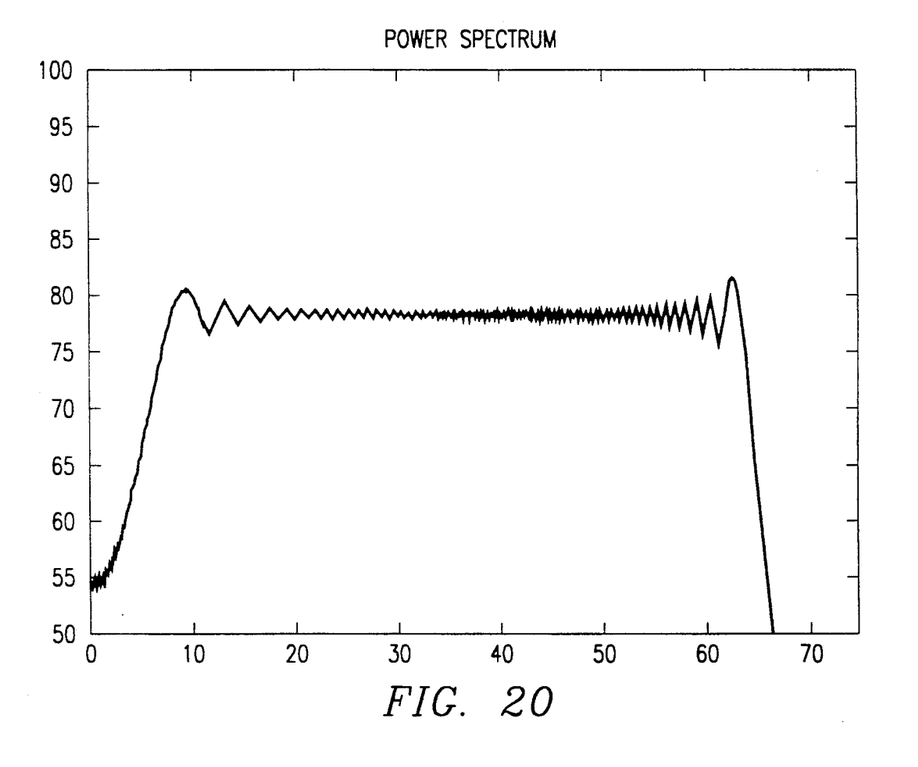

FIG. 19 illustrates the cross correlation x(t) $x_m(-t)$ and FIG. 20 the Fourier transform of the cross correlation illustrating the elimination of the power boost at higher frequencies. Hence, correlation of y(t) with such an $x_m(t)$ will provide a deboosted record. However, as FIG. 19 shows, and the ripple in FIG. 20 indicates, the cross correlation of $x_m(t)$ with x(t) has overly large sidelobes.

Third Example

A third example of the preferred embodiment method puts amplitude modification into the nonlinear sweep correlation reference to provide tapering but not deboosting. Again, take a nonlinear sweep without tapering x(t) as in FIG. 9. Then form the correlation reference $x_m(t)$ in the frequency domain by $$X_m(\omega)=X(\omega)|W(\omega)|$$

where $W(\omega)$ again is a selected filter window which may be generated from a tapered linear sweep. Correlation with $x_m(t)$ still requires a deboost such as by division in the frequency domain by $X(\omega)X^*(\omega)$. Again, x(t) would have a slight taper for mechanical reasons when applied to the typical wave generator.

Advantages

The preferred embodiments provide: (1) deboost in the correlation reference to "normalize" nonlinear sweeps and permit simple and better cross correlation. (2) tapering all in the correlation reference and avoids tapering of the nonlinear sweep driving the wave generator and thereby insures full power at the higher frequencies. (3) flexibility to account for local conditions: the sweep duration, sweep boost, and number of sweeps varies over time and place, so by providing a recipe for modifying the correlation reference the tapering and deboost can be adjusted in field.

Further Modifications and Variations

The preferred embodiments can be modified in various ways while retaining one or more of the features of an amplitude modification to define a correlation reference and thereby provide deboosting and/or tapering for a nonlinear sweep. For example, the linear frequency boost could be replaced by a more rapid or less rapid ramp up of frequency, and the frequency could be ramped down as well as up. The sweep duration and the taper durations could be varied, especially in response to local conditions. Or a sawtooth alternate up-down ramping could be used. The nonlinear sweep could have a varying amplitude. The sampling frequency could be changed. Correlation could be performed in the time domain. Multiple wave generators and arrays of geophones could be essentially simultaneously used provided crosstalk is avoided. The modified correlation reference could be used in marine acquisition.

Indeed, the amplitude modification to define a correlation reference could be used in acoustic analysis of objects in general, and not just subsurface earth structures.

What is claimed is:

1. A method of seismic analysis, comprising the steps of:

(a) generating at a surface a sweep (seismic wave with a variable frequency);

(b) receiving at said surface reflections of said sweep;

(c) correlating said reflections with a correlation reference to form a cross correlation, wherein said correlation reference is selected from the group of (1) said sweep with amplitude tapered at its beginning and its ending, (2) said sweep with amplitude varying according to the slope of its power spectrum being the negative of the slope of the power spectrum of said sweep in a frequency interval, and (3) said sweep with amplitude both tapered at its beginning and its ending and varying according to the slope of its power spectrum being the negative of the slope of the power spectrum of said sweep in a predetermined frequency interval; and (d) interpreting said cross correlation in terms of subsurface structures.

2. The method of claim 1, wherein:

(a) said sweep has a nonlinear frequency dependence with respect to time; and (b) said correlation reference is said sweep with amplitude varying according to the slope of its power spectrum being the negative of the slope of the power spectrum of said sweep in a predetermined frequency interval.

3. The method of claim 2, wherein:

(a) said nonlinear frequency dependence is a constant dB/Hz boost.

4. The method of claim 2, wherein:

(a) said correlation reference is said sweep with amplitude both tapered at its beginning and its ending and varying according to the slope of its power spectrum being the negative of the slope of the power spectrum of said sweep in a predetermined frequency interval.

5. The method of claim 1, wherein:

(a) said surface is the surface of the earth;

(b) said sweep has frequencies from about 5 Hz to about 65 Hz; and (c) said sweep has a duration of about 5 seconds.

6. The method of claim 1, wherein:

(a) said correlation reference is said sweep with amplitude both tapered at its beginning and its ending.

7. The method of claim 6, wherein:

(a) said sweep has a nonlinear frequency dependence with respect to time; and (b) said correlation reference is said sweep with amplitude both tapered at its beginning and its ending and varying according to the slope of its power spectrum being the negative of the slope of the power spectrum of said sweep in a predetermined frequency interval.

8. The method of claim 7, wherein:

(a) said nonlinear frequency dependence is a constant dB/Hz boost.

9. A system for seismic assessment, comprising:

(a) a sweep signal source;

(b) a seismic wave generator, said sweep signal source driving said generator;

(c) a seismic wave receiver; and (d) a correlator, said correlator with an input connected to an output of said wave recorder and with a correlation reference selected from the group of (1) a signal from said sweep signal source with amplitude tapered at its beginning and its ending, (2) a signal from said sweep signal source with amplitude varying according to the slope of its power spectrum being the negative of the slope of the power spectrum of said signal from said sweep signal source in a frequency interval, and (3) a signal from said sweep signal source with amplitude both tapered at its beginning and its ending and varying according to the slope of its power spectrum being the negative of the slope of the power spectrum of said signal from said sweep signal source in a predetermined frequency interval.

10. The system of claim 9, further comprising:

(a) a first plurality of wave receivers including said seismic wave receiver; and (b) a second plurality of digitizers, each of said digitizers connected between at least one of said wave receivers and said correlator.

11. The system of claim 10, wherein:

(a) said sweep signal has a nonlinear frequency dependence with respect to time; and (b) said correlation reference compensates for the power spectrum boost of said sweep signal.

12. The system of claim 11, wherein:

(a) said nonlinear frequency dependence is a constant dB/Hz boost.

13. The system of claim 9, wherein:

(a) said correlation reference provides greater tapering than said sweep signal.

14. A method of seismic analysis, comprising the steps of:

(a) generating a sweep (seismic wave with a variable frequency) with Fourier transform $X(\omega)$;

(b) receiving reflections of said sweep;

(c) correlating said reflections with a correlation reference to form a cross correlation, wherein said correlation reference has a Fourier transform $X(\omega)|W(\omega)|/|X(\omega)|(|X(\omega)|+WN)$ where $W(\omega)$ is a predetermined window bandpass filter and WN is a constant added to avoid division by 0 and is small compared to $|X(\omega)|$ in the frequency interval defined by $W(\omega)$; and (d) interpreting said cross correlation in terms of subsurface structures.

15. The method of claim 14, wherein:

(a) said $|X(\omega)|$ has a roughly linear increase over said frequency interval.

16. The method of claim 14, wherein:

(a) said correlation reference provides greater tapering than said sweep.

17. The method of claim 14, wherein:

(a) said sweep has frequencies from about 5 Hz to about 65 Hz; and (b) said sweep has a duration of about 5 seconds.

18. The method of claim 14, wherein:

(a) said window bandpass filter equals the autocorrelation of a linear tapered sweep.

* * * * *